United States Patent [19]
Eglit et al.

[11] Patent Number: 5,642,139
[45] Date of Patent: Jun. 24, 1997

[54] PCMCIA VIDEO CARD

[75] Inventors: Alexander Eglit, San Carlos; Rakesh Kumar Bindlish, San Jose; Vlad Bril, Campbell, all of Calif.

[73] Assignee: Cirrus Logic, Inc., Fremont, Calif.

[21] Appl. No.: 235,761

[22] Filed: Apr. 29, 1994

[51] Int. Cl.$^6$ ........................................ G09G 5/00
[52] U.S. Cl. .............. 345/202; 364/715.02; 382/233; 348/396; 345/155
[58] Field of Search ........................ 345/201, 202, 345/185, 200, 153, 154, 155; 364/715.02, 715.01, DIG. 2; 382/233; 395/162, 164; 348/384, 385, 396

[56] References Cited

U.S. PATENT DOCUMENTS

| | | | |
|---|---|---|---|
| 4,238,768 | 12/1980 | Mitsuya et al. | 348/420 |
| 4,797,729 | 1/1989 | Tsai | 382/272 |
| 4,949,169 | 8/1990 | Lumelsky et al. | 348/8 |
| 5,132,670 | 7/1992 | Miller | 345/155 |
| 5,170,152 | 12/1992 | Taylor | 345/155 |
| 5,185,655 | 2/1993 | Wakeland | 348/392 |
| 5,261,049 | 11/1993 | Lumelsky et al. | 395/164 |
| 5,319,395 | 6/1994 | Larky et al. | 345/200 |
| 5,377,018 | 12/1994 | Rafferty | 358/433 |
| 5,410,547 | 4/1995 | Drain | 371/22.4 |
| 5,420,608 | 5/1995 | Choi et al. | 345/186 |
| 5,436,641 | 7/1995 | Hoang et al. | 345/201 |

FOREIGN PATENT DOCUMENTS

| | | |
|---|---|---|
| 0525426A1 | 2/1993 | European Pat. Off. . |
| WO93/15453 | 8/1993 | WIPO . |

*Primary Examiner*—Richard Hjerpe
*Assistant Examiner*—Amare Mengistu
*Attorney, Agent, or Firm*—William E. Alford; David L. Stewart; J. P. Violette

[57] ABSTRACT

Motion video may be imported into a personal or portable computer through an I/O port having a limited data bandwidth, such as a PCMCIA interface. Motion video data is compressed by sub-sampling both luminance and chrominance difference data for different sized groups of pixels. The compression apparatus may be formed on a PCMCIA card which interfaces with a personal or portable computer. Motion video data, compressed by as much as 5:1 or 6:1, is transferred through the PCMCIA card to a host computer. The host computer may serialize the compressed data and store the data in serialized compressed format in a video memory of a video controller. The video controller is provided with decompression circuitry to decompress the motion video data into luminance and chrominance difference data. The luminance and chrominance difference data is converted into RGB data and displayed in a video display.

14 Claims, 6 Drawing Sheets

PCMCIA VIDEO CARD

CROSS-REFERENCE TO RELATED APPLICATION

The subject matter of this application is related to that in co-pending application by the same inventors having serial number 08/235,764 (attorney docket No. 2069-011) entitled "VARIABLE PIXEL DEPTH AND FORMAT FOR WINDOWS" to be assigned to the same assignee of the present invention.

TECHNICAL FIELD

The present invention is directed to processing video signals, particularly in portable and personal computers. The present invention has particular application to inputting video signals through a computer I/O port having a limited data bandwidth, such as a PCMCIA interface.

BACKGROUND ART

Live action or full motion video has been used with personal computers, particularly for so-called multimedia presentations where different types of media are combined to present information to a user. In addition, personal computers have been increasingly used in video applications to manipulate video signals (e.g., editing, computer animation, or the like).

For the purposes of this application, the term "motion video" is interpreted to mean any video segment or presentation including live action, real time, or full motion video. Examples of motion video include, but are not limited to, NTSC, PAL, SECAM, or MUSE type television signals, digital and analog HDTV signals, or the like, including live television signals or broadcasts, cable television signals or the like, or motion picture video, which may be suitably digitized and converted into a format suitable for presentation on a computer display. The term motion video may also include, but is not limited to, any computer generated display or display segment, including computer animation or the like.

For multimedia presentations, it is particularly useful to be able to provide a motion video interface to a portable or so-called notebook or laptop computer or the like (collectively referred to hereinafter as "portable computer") to display motion video on a computer screen or attached monitor or television. A separate video interface may be provided in a portable computer, tied to the system bus or incorporated into the video adapter in order to import motion video into the portable computer. However, such an interface would increase the cost of a personal or portable computer significantly. Since only a potion of computer users are envisioned as requiring such a video interface, it is desirable to be able to offer a video interface as an add-on option for a personal or portable computer.

In order to support optional features for portable or personal computers, an industry standard known as the PCMCIA standard has been developed to allow computer manufacturers to offer optional features on a removable card, referred to as a PCMCIA card. Optional features such as modems, I/O ports, network interfaces, and even hard drives have been incorporated into PCMCIA cards which may be used to upgrade a portable or personal computer to add such features.

FIG. 1 shows a notebook computer 100 provided with a PCMCIA interface 101. Although shown here as a notebook computer, as applied to the present invention, other types of computers may also be used, including portable, transportable, lap-top, palm-top, personal digital assistants (PDAs), pen based computers, or the like, or Personal Computers (PCs) such as the IBM™ PC, Apple™ Macintosh™, or the like or other types of computer systems (e.g., mainframes, minis, or the like) where it is desirable to import video images through a PCMCIA or similar type data port.

Notebook computer 100 may be provided with a system bus 102 shown here as a PCI bus having a data bandwidth in the range of 25 to 30 megabytes per second. Notebook computer 100 is provided with a CPU 103 (e.g., Intel™ Pentium™, 486, 386 or the like, or Motorola™ 68000 or the like) coupled to the system bus 102. Notebook computer 100 is also provided with a system memory 104 also coupled to system bus 102.

A video controller 105, shown here as a VGA controller, is also coupled to system bus 102. Video controller 105 may comprise another type of controller such as a SVGA controller or the like, and may also be provided with a video memory 110 which may be periodically refreshed by CPU 103. Video controller 105 is connected to panel display 106 which may comprise a flat panel display (e.g., active matrix type, passive matrix type, gas plasma, or the like). A CRT port 107 may also (or alternately) be provided to provide an image on a CRT screen. Although not shown, other types of video output ports may also be provided, including a television output (e.g., NTSC, PAL, SECAM, MUSE, analog HDTV, digital HDTV or the like, any of which may be either broadband or baseband outputs).

Also coupled to system bus 102 is PCMCIA host 108 which in turn is coupled to PCMCIA interface 101. The construction of such a PCMCIA host is known in the art and provides the necessary interface between the system bus 102 and a PCMCIA compatible device (i.e., PCMCIA card) coupled to PCMCIA interface 101. The PCMCIA host, by design, has a data bandwidth of approximately five megabytes per second. A PCMCIA card 109 may be selectively and removably coupled to PCMCIA host 108 through PCMCIA interface 101. In the prior art, the PCMCIA card 109 may comprise a modem, network interface, serial port, parallel port, memory card, hard drive, or other peripheral device.

Unfortunately, the PCMCIA standard has some inherent limitations which make it difficult to adapt to video data transmission. For motion video, digitized under the CCIR 601 standard, for example, an average bandwidth of 27 megabytes per second may be required in order to transmit the video data from one device to another.

Modern high performance computers (e.g., Intel™ Pentium™, 486-33 MHz, or the like) using advanced bus structures such as the PCI or VESA bus architecture may have a memory bandwidth in the range of 25 to 35 megabytes per second. Thus, motion video data can be successfully transmitted within the bus structure of a high performance portable or personal computer. However, as discussed above in connection with FIG. 1, the PCMCIA interface has a bandwidth limitation of five megabytes per second. Thus, the PCMCIA interface acts as a bottleneck or barrier for transmitting continuous motion video to a portable or personal computer.

The present invention, as discussed below, provides a data compression technique which compresses video data into a narrower bandwidth which may be transmitted through the PCMCIA interface. Various video compression techniques are known in the art and have been implemented to reduce bandwidth or increase channel space, for example, for satellite, cable TV, so-called "Video On Demand" or other video services (e.g., Picturephone™ or the like). One technique developed for black and white video transmission is described in "Block Truncation Coding: A New Approach to Image Compression", O. R. Mitchell et al, Conference Records, IEEE International Conference on Communication I, June 1978, 12B.1.1-12B.1.4, which utilized a relatively simple technique. This technique relies upon the fact that the human eye generally does not ascertain all of the minute distinctions which may be present in a video signal. In order to provide a useful video image, one need only reproduce a video image which is visually indistinguishable from the transmitted image, regardless as to whether any of the quality of the data is lost.

FIGS. 2A-C show the operation of such a prior art technique. In this technique, a video image made up of a number of pixels may be divided into blocks of 4 pixels by 4 pixels each, as shown in FIG. 2A. For this black and white or monochrome image, only luminance values are discussed. The brightness distribution for the sixteen pixels within the 4×4 block of FIG. 2A can be shown graphically in FIG. 2B as a typical distribution (i.e., bell curve) having a mean value and (first moment) and standard deviation (second moment). Those pixels having a brightness greater than the mean may be assigned a value equal to the mean value plus one standard deviation, whereas those pixel values having a brightness less than the mean value may be assigned a brightness value equal to the mean value minus the standard deviation. The pixel data may then be transmitted as one bit for each pixel value for the 4×4 pixel matrix, along with the mean and standard deviation values.

The overall distribution of the compressed data, shown in FIG. 2C, comprising only two data points is mathematically the same distribution as the original data (i.e., same mean and standard deviation values). Since the human eye senses the differences in the relative intensities of light, the compressed image appears the same as the original image, as the brightness (luminance) distribution of the two images is the same.

Although this technique reduces the analog pixel values to discrete levels, the system still requires at least one bit per pixel to transmit the luminance values (relative intensities) for each pixel in the matrix. In addition, the two moment values (mean and standard deviation) must also be transmitted for each matrix of pixels. This technique also does not provide for the transmission of color images. Finally, since the pixels are arranged in a matrix, the data must be serialized at the receiver in order to provide image data in a scan line format.

DISCLOSURE OF THE INVENTION

One advantage of the present invention is in providing a technique for transmitting motion video through a computer I/O port having a limited data bandwidth.

Another advantage of the invention is in providing a PCMCIA card which can transmit full motion or live action video through a PCMCIA host to a computer data bus.

A further advantage is in an improved video controller which may selectively decompress compressed motion video data and display the resultant motion video image on a display.

A still further advantage of the present invention is in a compression scheme to compress CCIR 601 video data into a bandwidth which may be transmitted through a PCMCIA interface.

Another advantage of the invention is in providing a novel compression technique for compressing video data.

The above and other advantage of this invention are realized by a novel video controller that receives and decompresses compressed video data comprising at least a pixel bit map, each pixel of the pixel bit map being represented by one of a number of pixel values. A FIFO receives at least the pixel bit map and the number of pixel values. A serializer, coupled to the FIFO and a pixel clock, stores the pixel bit map and outputs a sequential bit from the pixel luminance bit map synchronized with the pixel clock. At least one pixel value register, coupled to the FIFO and the pixel clock, stores a pixel value and outputs the pixel value synchronized with the pixel clock. A MUX, coupled to the serializer, and the at least one pixel value register, selectively outputs the pixel value as pixel data in response to the sequential bit output from the pixel luminance bit map.

A method of compressing video data in accordance with this invention comprises the following steps. The standard distribution of the luminance of a first predetermined number of pixels, including a mean value and a standard deviation, is determined. An upper value and a lower value are determined which when combined have substantially the same mean and standard deviation as the standard distribution of the luminance of the first predetermined number of pixels. The luminance value of each of the first predetermined number of pixels is compared to the mean value of the standard distribution of the luminance of the first predetermined number of pixels. A binary value is assigned to each of the first predetermined number of pixels on the basis of the comparing step to form a pixel bit map. The upper value and the lower value are converted into binary numbers having a predetermined number of bits to form binary upper and lower values. The first pixel bit map and the binary upper and lower values are then transmitted as compressed luminance data. The chrominance data is compressed using a similar technique, however the number of pixels for which the standard deviation is determined may be different than that for the luminance data.

BEST MODE FOR CARRYING OUT THE INVENTION

Figure 1:
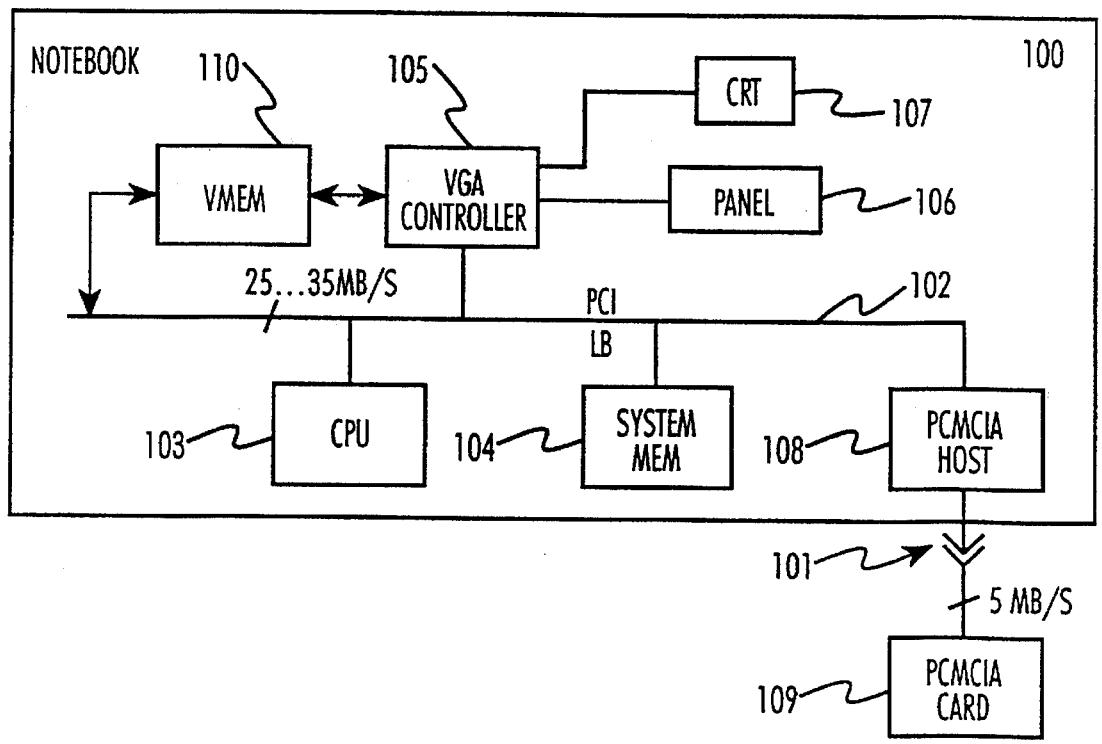
FIG. 1 is a block diagram of a prior art notebook computer showing the major elements of the computer system and the PCMCIA interface.
Figure 2A:
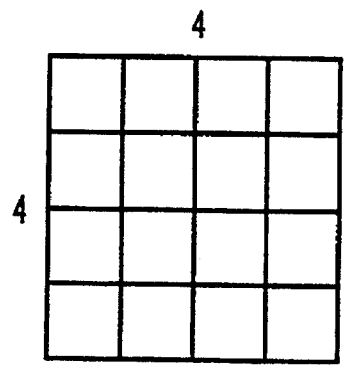
FIGS. 2A-C are diagrams showing the operation of a prior art data compression scheme.
Figure 2B:
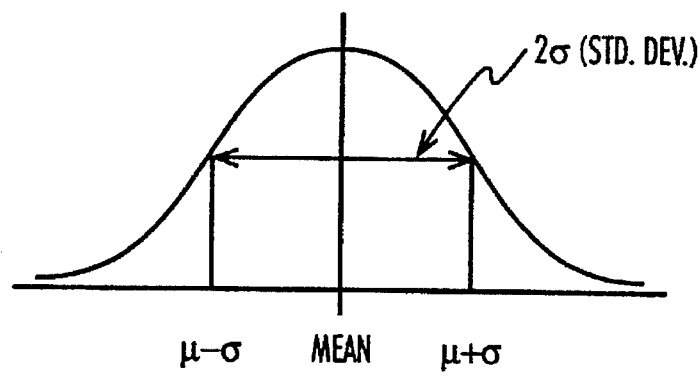
Figure 2C:
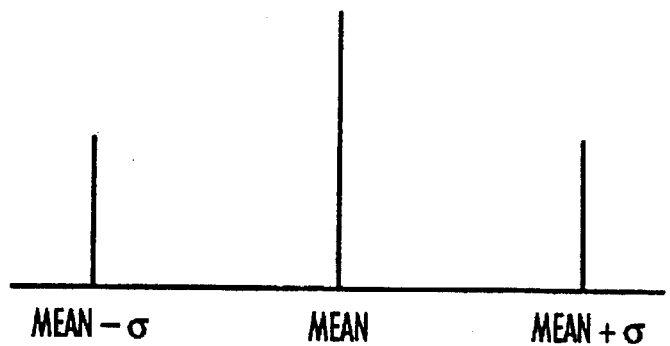

Referring again to FIG. 1, the present invention provides for the transmission of motion video to the system bus 102 of a computer 100 through PCMCIA interface 101 by first compressing the motion video data into a data bandwidth narrower than the bandwidth limitation of PCMCIA interface 101. An improved video controller is provided in place of the video controller 105 in FIG. 1. The improved video controller of the present invention decompresses the compressed motion video data and converts the data into a format which may be displayed on flat panel display 106, a CRT, or television.

Figure 3:
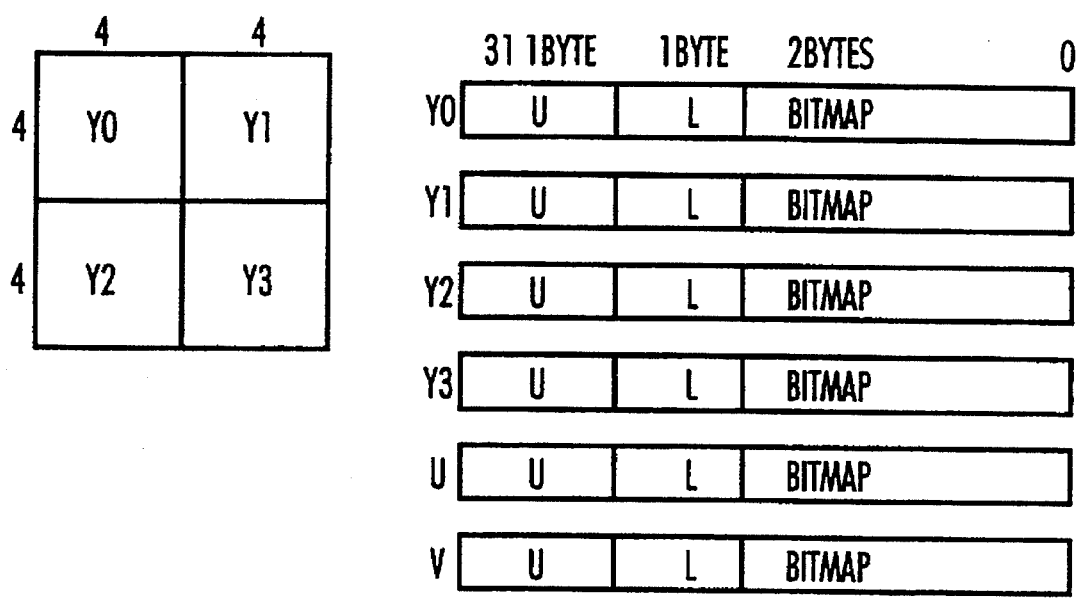
FIG. 3 is a diagram of the compression scheme of the present invention.

FIG. 3 shows a diagram of the compression scheme of the present invention. For a particular video image comprising a number of pixels, the image is broken up into a series of blocks which may be eight pixels by eight pixels wide as shown in FIG. 3. These blocks may be further divided in a number of sub-blocks, for example, as shown in FIG. 3, four sub-blocks Y0, Y1, Y2, and Y3 of sixteen pixels. Each sub-block Y0, Y1, Y2, and Y3 is shown as a square sub-block of four pixels by four pixels each, for a total of sixteen pixels.

The luminance (Y) values for the sixteen pixels in the sub-block are sub-sampled. This sub-sampling assigns one of two values, upper (U) or lower (L) to each pixel in the sub-block. In the present invention the sub-sampling generates 8 or 6 bits each for the upper (U) and lower (L) values, however other bit lengths could be generated. Note that the upper (U) value should not be confused with the chrominance difference signals (U,V). For each sub-block, a mean (average) luminance (Y) value is calculated by adding all of the luminance (Y) values of the pixels and dividing by the number of pixels (in this instance sixteen). Next, the two values, upper (U) and lower (L) are calculated from this mean. The upper (U) value may be calculated as the mean value plus one standard deviation, while the lower value may be calculated as the mean value minus the standard deviation, although other techniques may be used. The main idea in choosing upper (U) and lower (L) values is preservation of N first moments in statistical distribution of pixel values.

The luminance values for each pixel in a sub-block are then compared to the mean or upper (U) and lower (L) values. A bitmap is then created for each sub-block by assigning a binary (0 or 1) value to each pixel in the sub-block after comparing the pixel value to the mean or upper (U) and lower (L) values. Pixel luminance data below the mean or threshold value may be assigned a 0, whereas pixel luminance data above the threshold or mean value may be assigned a 1. Thus, each of the sixteen pixels has a luminance bit which is either 0 or 1, forming a sixteen bit (two byte) bit map as shown in FIG. 3. In addition to the bit map, the upper (U) and lower (L) luminance values may each be converted into eight bit (one byte) data corresponding to each bit map, as shown in FIG. 3 or may be converted into six bits of data each.

Thus, for each sub-block Y0, Y1, Y2, and Y3, a total of 32 bits (16 bits of bitmap, 8 bits of upper luminance, 8 bits of lower luminance) or a total of 28 bits (16 bits of bitmap, 6 bits of upper luminance, 6 bits of lower luminance) are required to transmit the luminance information which is equivalent to 2 bits per pixel or 1.75 bits per pixel respectively. As discussed above further compression may be achieved by reducing the number of bits representing the upper (U) and lower (L) values to six bits each. To reproduce the luminance portion of the sub-block, each pixel in the sub-block is assigned either the upper (U) or lower (L) value as indicated by the corresponding bit map. Since the human eye is sensitive to differences in luminance, the reproduced luminance image appears substantially the same as the original image.

The chrominance difference signals (U, V) are sub-sampled for the eight pixel by eight pixel block. In the preferred embodiment of the present invention, as shown in FIG. 3, an 8×8 pixel matrix may be used, however, other size blocks may also be employed as well as non-square size blocks (e.g., 10×10, 16×16, or the like). The human eye has less spatial resolution sensitivity for color (chrominance) such that the chrominance values can be compressed further than the luminance values. The chrominance difference (U,V) signals are sub-sampled, and upper (U) and lower (L) values are calculated for each chrominance difference signal (U,V) and converted into eight bit (one byte) values or having increased compression converted into six bit values. In order to provide a sixteen bit bitmap for each of the chrominance difference signals (U,V), the bitmap is configured such that each bit represents four adjacent pixels (or a two pixel by two pixel sub-sub block).

Thus, as shown in FIG. 3, the chrominance difference signals (U,V) and associated bitmaps for one block can be compressed into eight bytes. Hence, sixty-four pixels within one block can be characterized by 24 bytes or 192 bits, or three bits per pixel, as shown in FIG. 3.

Further data compression as described above may be achieved by reducing the number of bits necessary to characterize the upper (U) and lower (L) values for luminance (Y) and chrominance difference (U,V) signals. For example, as shown in FIG. 3, if six bits per pixel are used to characterize each of the upper (U) and lower (L) values, a compression ratio of 2.6 bits per pixel may be achieved. For the purposes of this application, the use of eight bits for each upper (U) and lower (L) values will be referred to as eight bit U/L resolution. Similarly, the use of six bits for upper (U) and lower (L) value will be referred to as six bit U/L resolution. Hybrid resolutions may also be used, wherein luminance (Y) values are assigned a first U/L resolution and chrominance difference (U,V) are assigned a second U/L resolution. Similarly, U/L resolutions other than eight or six may be utilized. Greater resolutions may enhance the quality of the video signal and decrease compression ratio. Smaller resolutions may increase the compression ratio at some slight sacrifice in video image quality.

For motion video, a pixel depth of least sixteen bits per pixel may be required in order to provide a realistic video display. Thus, compressing the video data to three or 2.6 bits per pixel results in a compression ratio of approximately 5:1 and 6:1, respectively. As discussed above, motion video digitized using the CCIR 601 standard has a data bandwidth of approximately 27 megabytes per second. Using these compression ratios, the data bandwidth may be reduced to fall within the range of that acceptable to a PCMCIA interface.

Further compression may be achieved using additional sampling techniques. For example, groups of blocks may be sub-sampled, and upper (U) and lower (L) values may be characterized based upon the sampling of these groups of blocks. Thus, for each block, the number of bits for each upper (U) and lower (L) value may be further reduced and compression ratio further increased.

Although an eight pixel by eight pixel block size is shown in FIG. 3, other block or sub-block sizes may also be used. Smaller block sizes tend to reduce the compression ratio as the number of bits transmitted relative to the number of upper and lower values decreases. Similarly, larger block or sub-block sizes may be used which may increase the compression ratio. However, such a larger block may reduce the perceived resolution of the picture, as the luminance data for a larger area will be averaged.

Compressed video data received through the PCMCIA interface 101 of FIG. 1 is transferred to a system bus 102 which in turn may be accessed by most devices on that bus. The improved video controller of the present invention receives the compressed motion video data stored in video memory 110.

In the prior art, video data is typically transferred from CPU 103 to video memory 110 through system bus 102. Such data may comprise, for example, graphics data or text data. Text data typically comprises ASCII data and associated font bit maps which are loaded into different planes of video memory 110. Text data is generally unsuitable for displaying complex graphic images required for motion video. Graphics data may comprise bit mapped pixel data, with a number of bits assigned to represent each pixel (i.e., pixel depth). Generally, graphics data is stored in video memory 110 in a sequential format such that the data may be read out and scanned onto a video screen in the same order.

In the present invention, as shown in FIG. 3, the pixel data is compressed by grouping the pixels into blocks of adjacent pixels. Since most video controllers generate a video image by scanning on a line by line basis, the block data must be readable in a scan line format. Further, using the compression format discussed above, the chrominance difference data (U,V) is organized for each eight scan lines in a block, whereas the luminance data is organized for each four scan lines in a sub-block. When data is read from the memory to be displayed, data from only one scan line is used. Thus, the same data would be read again and again for each scan line, raising the bandwidth requirements for video memory 110 to the equivalent of a sixteen bit per pixel bit map format.

Figure 4:
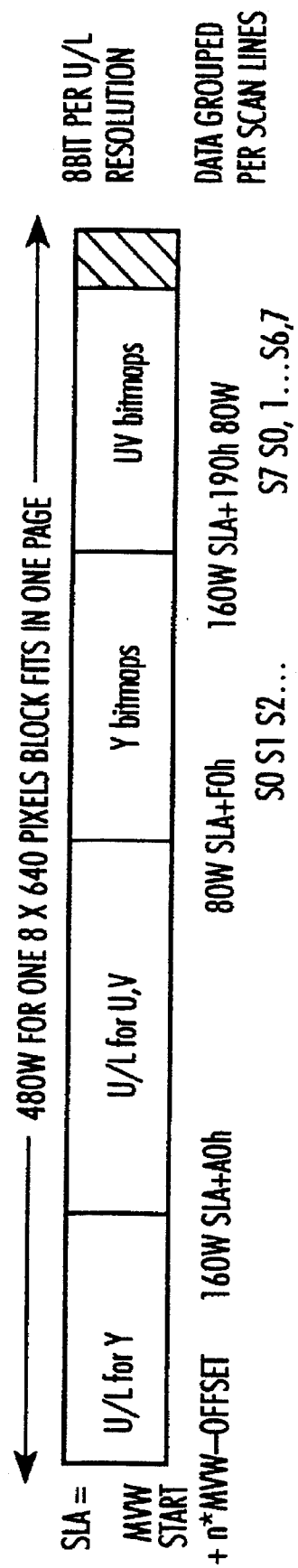
FIG. 4 is a diagram showing the serializing scheme for motion video data compressed using the technique of FIG. 3.

In order to overcome this problem and reduce video memory bandwidth requirements, a scan line oriented segregated mode of data organization is employed, as shown in FIG. 4. Data may be organized into chunks of 32 sequential pixel portions of a scan line. The data organization may occur either during the compression process, or after the data has been received in the computer. Thus, the compressed data may be transmitted in a serialized format (scan line by scan line) or may be transmitted in compressed format and serialized once received by the host computer. Within the host computer, serialization may be performed by the CPU 103 using appropriate software. Thus, for example, the compressed motion video data may be received by PCMCIA host 108 and stored in system memory 104 through system bus 102. CPU 103 may retrieve the compressed data, perform the serialization scheme discussed below, and store the serialized data in the improved video controller of the present invention. Alternatively, the improved video controller of the present invention or an improved version of PCMCIA host 108 may perform the serialization procedure.

For the luminance data, one 32 pixel portion (chunk) of a scan line crosses eight adjacent sub-blocks. For an embodiment using eight bit U/L resolution, eight pairs of upper (U) and lower (L) sequential values are needed or four 32-bit words. For an embodiment using six bit U/L resolution, a total of three 32-bit words are required. In addition, one 32-bit word is required as a bit map for the 32 pixels in the scan line portion. Thus, a total of five 32-bit words are required at eight bit U/L resolution, and four words for six bit U/L resolution.

Chrominance difference data (U,V), upper (U) and lower (L) value data, are required for four adjacent blocks to form one 32-bit portion of a scan line. For eight bit U/L resolution, each block requires one 32-bit word for both upper (U) and lower (L) values for both chrominance difference signals (U,V), as shown in FIG. 3. For four adjacent blocks, a total of four words are required and eight bit U/L resolution.

Similarly, for six bit U/L resolution, three 32-bit words are required. An additional 32-bit word is required as a serialized bit map for chrominance (U,V) data, regardless of U/L resolution. Thus, for eight bit U/L resolution, a total of five words are required, whereas for six bit U/L resolution, a total of four words are required.

To serialize one 32 pixel portion (chunk) of a scan line, both luminance (Y) and chrominance (U,V) data, at eight bit resolution, a total of ten 32-bit words are required, or 320 bits, or ten bits per pixel. This results in a compression ratio of 1.6:1 for the serialized compressed data. For six bit U/L resolution, a total of eight 32-bit words, or 256 bits, or 8 bits per pixel, a compression ratio of 2:1.

In the preferred embodiment, data is received at PCMCIA interface 101 and is serialized by CPU 103 or by an improved version of video controller 105 and stored in video memory 110. As will be discussed below in connection with FIG. 6, the improved version of video controller 105 generates a video image directly from the serialized compressed video data.

Figure 5:
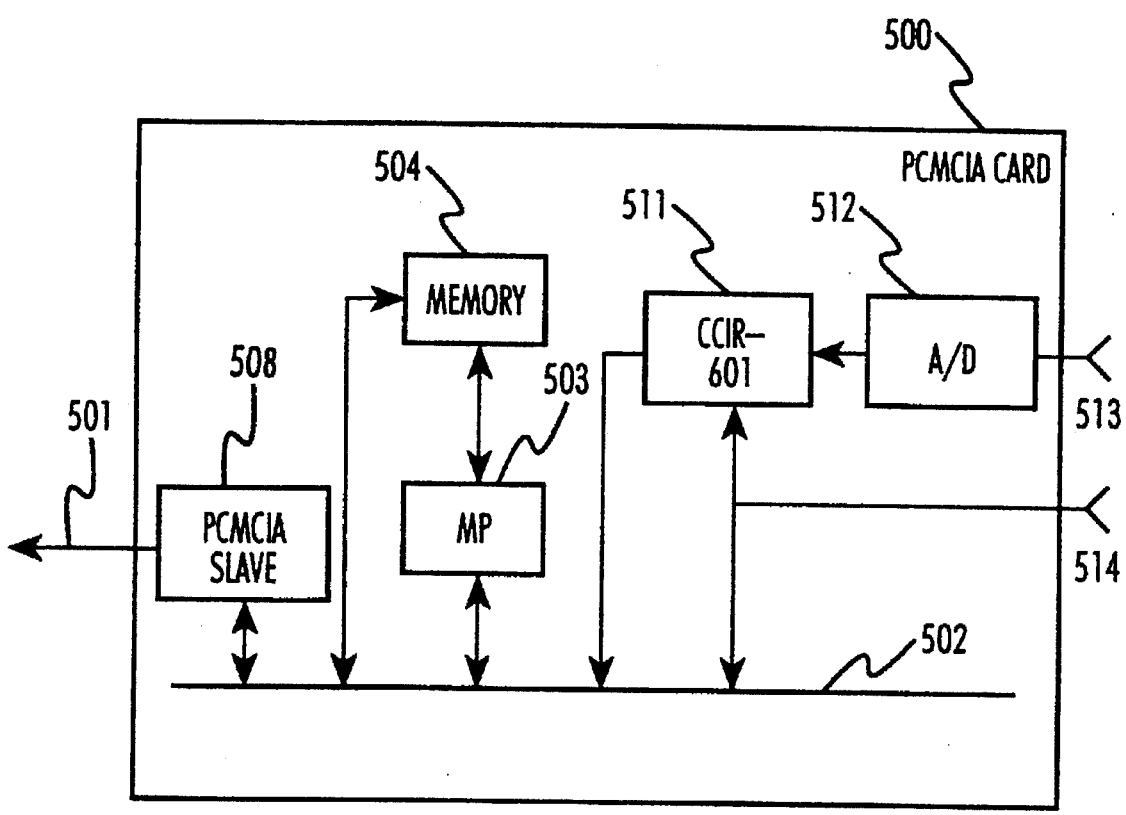
FIG. 5 is a block diagram of a PCMCIA card incorporating a motion video data compressor.

The data compressor of the present invention may comprise a microprocessor or advanced logic circuitry programmed to perform the compression scheme shown in FIGS. 3 and 4. An example of such a device is shown in FIG. 5. For the purposes of illustration, the audio portion of the input signal is not shown. Various techniques for digitizing an audio signal are known in the art and may be suitably employed. Generally, the bandwidth required for the video portion of an audio/visual signal is far greater than the audio portion, and thus digitized audio signals can be provided without significantly increasing the overall required data bandwidth of the audio/visual signal.

As shown in FIG. 5, the motion video receiver and data compressor may be provided on a removable motion video card 500 which may comprise a PCMCIA card. Since the motion video receiver is provided as an optional add-on feature, the apparatus is not as cost sensitive as the portable or personal computer to which it is to be attached. Thus, the motion video receiver may be provided with an internal microprocessor or control logic 503 to process and compress motion video data.

Motion video card 500 may be provided with an analog video input 513 which may receive analog video signals (broadband or baseband) such as NTSC, PAL, SECAM, MUSE or the like. The video signals are digitized in A/D converter 512 and may be converted to a digital standard, such as CCIR-601 in converter 511. Converter 511 may be coupled to a card bus 502 which may communicate with other devices on motion video card 500.

Motion video card 500 may also be provided with a digital video input 514 for receiving digitized video signals (e.g., CCIR-601, HDTV or the like). These digitized video signals may be transferred to card bus 502 through suitable buffers (not shown) or converted into a digital standard in converter 511.

Digital video signals transferred to card bus 502 may be stored in memory 504 and compressed using the technique discussed above in connection with FIGS. 3 and 4 using control logic or processor 503. Alternatively, memory 504 may be eliminated or replaced with a suitable FIFO or buffer, and processing performed in real time. Compressed data is then transferred to PCMCIA slave 508 which interfaces with the host computer through PCMCIA interface 501.

Figure 6:
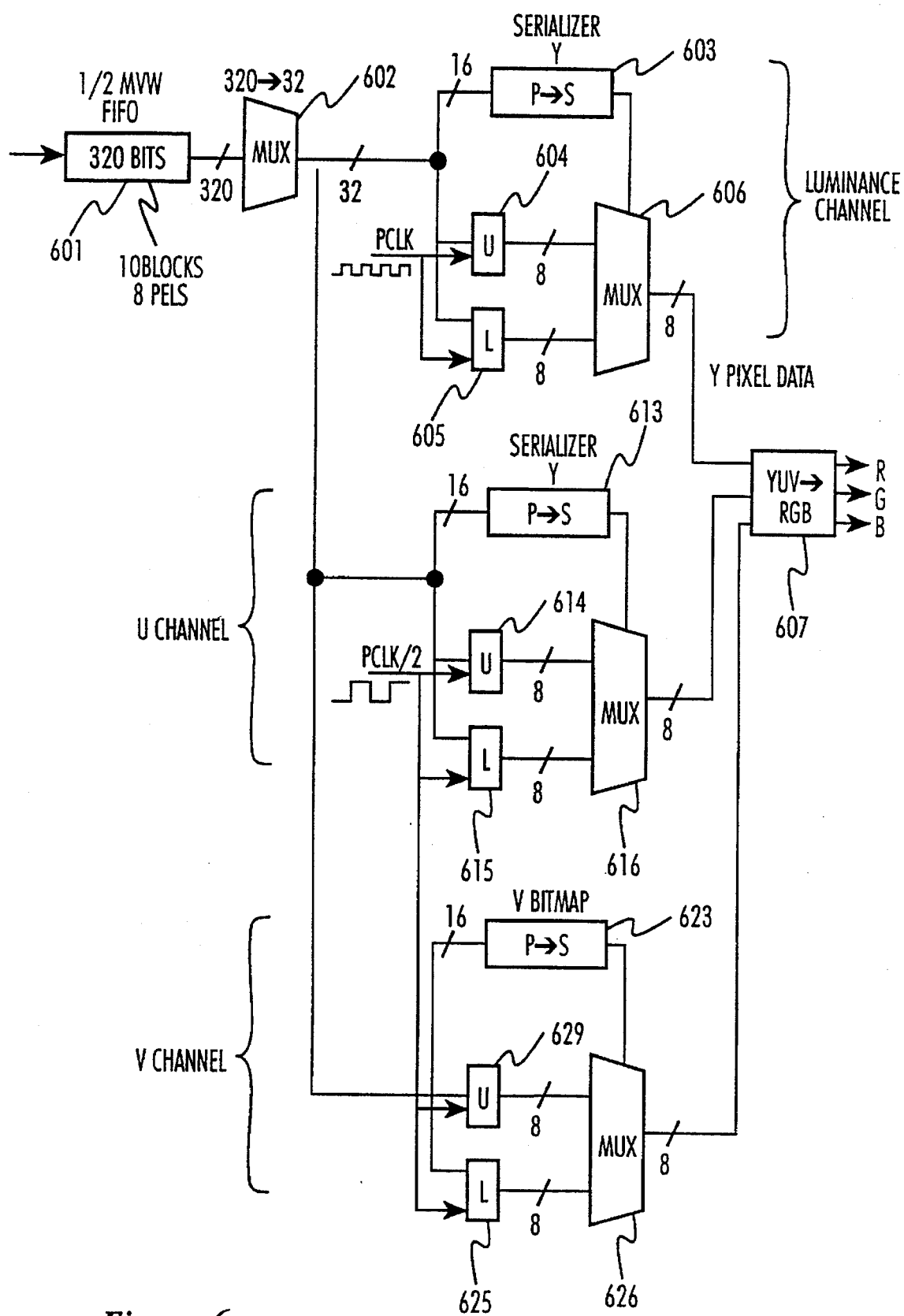
FIG. 6 is a block diagram of a video controller for receiving compressed video data, decompressing the data and formatting the data for display on a video display.

FIG. 6 shows a portion of the improved video controller of the present invention incorporating circuitry to decompress motion video data and display the motion video. The improved video controller of the present invention may particularly be applied to the video controller disclosed in co-pending application Ser. No. 08/235,764 (attorney docket number 2069-011), entitled "VARIABLE PIXEL DEPTH AND FORMAT FOR WINDOWS". Alternatively, the improvements for a video controller of the present invention may be applied to a prior art video controller (e.g., VGA, SVGA or the like) which are known in the art.

FIG. 6 shows motion video window (MVW) FIFO 601, as disclosed, for example, in co-pending application attorneys docket number 2069-011 discussed above. Alternatively, MVW FIFO 601 may comprise a CRT FIFO as known in the video controller art. FIFO 601 receives serialized compressed motion video data from video memory 110. FIFO 601 may be 32 bits wide and twenty 32-bit words deep. One half of FIFO 601 may comprise a total of 320 bit of data representing a total of 32 pixels of serialized compressed video data. These 320 bits of data may be transferred in parallel to MUX 602 which converts the data into a stream of 32-bit words.

The stream of 32-bit words may comprise a number of luminance and chrominance data as discussed above in connection with FIG. 4. For example, one word may comprise a serialized luminance (Y) data bit map, for the 32 pixel portion of the scan line. Another word may comprise the serialized chrominance (U,V) data bit maps (16 bits each) for the 32 pixel portion of the scan line. Four words are required to provide the upper (U) and lower (L) luminance (Y) values for the eight adjacent sub-blocks crossed by the 32 pixel scan line portion. Similarly, four more words are required to provide the respective upper (U) and lower (L) chrominance difference (U,V) values of the four adjacent blocks crossed by the 32 pixel scan line portion. Thus, a total of 10 words define one 32 pixel portion of a scan line.

The luminance (Y) bit map portion of the 10 word data block is loaded into serializer 603, whereas upper (U) and lower (L) values for a given sub-block are stored in luminance (Y) upper (U) register 604 and luminance (Y) lower (L) register 605, respectively. With each pixel clock cycle, the contents of registers 604 and 605 are driven to MUX 606. MUX 606 is driven by data form the luminance pixel map stored in serializer 603. Thus, the output of MUX 606 comprises either the appropriate upper (U) or lower (L) luminance (Y) value assigned to a particular pixel in the 32 pixel scan line portion.

Similar circuitry is provided for the chrominance difference (U,V) data in the U channel and V channels shown in FIG. 6. Since the chrominance difference signals are sub-sampled for every sub-sub block of 4×4 pixels, one scan line will cross two pixels of each sub-sub block. Thus, the clock signal driving upper (U) and lower (L) registers 614, 615, 624, and 625 for the chrominance difference (U,V) data comprises the pixel clock divided by two.

The data output from MUXes 606, 616, and 626 comprises YUV motion video data, which in the preferred embodiment is in a CCIR 601 format. In order to display the motion video data as a display, the data must be converted into standard RGB data which can then be manipulated by conventional video controller circuitry. An example of a video controller incorporating CRT and flat panel display outputs is discussed, for example, in U.S. Pat. No. 5,122, 783, issued Jun. 16, 1992, or in U.S. Pat. No. 5,185,602, issued Feb. 9, 1993, both of which are incorporated herein by reference.

YUV to RGB converter 607 converts the input YUV signals to standard RGB output which may be used to directly drive a DAC or may first be passed through a RAM palette for color conversion. The ideal YUV to RGB transformation is as follows:

R=Y+1.37 V

B=Y+1.73 U

G=Y−0.699 V−0.336 U

However, such conversion constants may be difficult (and expensive) to achieve using conventional circuitry. It has been determined that the following conversion factor may be applied without unduly increasing objective color error:

R=Y+1.375 V

B=Y+1.75 U

G=Y−0.375 U−0.75 V

As is readily apparent, these latter conversion factors may be more readily generated using simple circuitry. In the preferred embodiment, this conversion is implemented by using eight 9-bit adders which should support in excess of 128 or two's complement U,V formats. Other adder sizes may used to perform the conversion such as 6-bit adders. Note that while U and V may be negative, Y is always a positive value.

Other conversion factors may be provided to support other types of compression techniques such as Cinepak™. For Cinepak™, the standard conversion factors are:

R=V+Y

B=U+Y

G=Y−V/2−U/4

As discussed above, a portable or personal computer may be a rather cost sensitive product. Thus, while it may be desirable to provide for motion video input to a portable or personal computer, the excess cost is justified only if a majority of purchasers demand such a feature. An individual desiring to import motion video into his or her portable or personal computer is prepared to pay the additional expense for the value added to the product. The present invention fulfills these objectives by providing an inexpensive, relatively simple decompression circuitry which can be provided in an improved video controller with relatively little additional expense.

A more expensive and sophisticated PCMCIA or other type of interface card may be provided to compress motion video data and transfer the motion video data to the personal and portable computer. Since the capability of importing motion video to a personal or portable computer has a high value to the user desiring such a feature, the provision of the compression apparatus in the PCMCIA card better aligns the cost of the product with the income source.

It will be readily seen by one of ordinary skill in the art that the present invention accommodates all of the advantages set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

For example, although the motion video data compression scheme is described in connection with a PCMCIA interface, the compression scheme may also be applied to other environments where is desirable to digitize and/or compress video data. Further, although a PCMCIA interface is disclosed, the apparatus of the present invention may also be applied to other types of data compression where is it desirable to interface a motion video source with a computer system.

Further, although the blocks and sub-block of the present invention are shown as square blocks, other shaped blocks may also be used. For example, a rectangular block (e.g., 4 pixels by 16 pixels) may be used, having square or rectangular sub-blocks. Further, the block and sub-block sizes may be made the same, although such a scheme may reduce the compressibility ratio of the motion video signal.

The compression scheme of the present invention may have other applications. Since the motion video has been compressed by as much as 5:1 or 6:1, the data bandwidth has been substantially reduced to the point where slower peripheral and I/O devices may be used to process or store motion video data. For example, the compression technique of the present invention may provide motion video data at a memory bandwidth which may be store in real time on a hard disk drive (HDD). Motion video may be recorded in real time on a hard drive and replayed at a later time. In addition, a portable or personal computer having a relatively limited data bandwidth may be used to create, edit, or otherwise modify or manipulate motion video, including continuous motion video, without the requirement for expensive high speed memory devices or with long delays for loading and storing information.

Similarly, although two values, upper (U) and lower (L), are disclosed for all YUV values, other numbers of values may be used. For example, a total of four values may be used, assigned as mean plus or minus one standard deviation, and mean plus or minus two standard deviations. A larger number of standard values may enable the block sizes to be increased without significantly decreasing picture quality or compression factor.

The present invention is described in terms of compressing YUV data. However other types of motion video data may also be compressed using the techniques of the present invention. For example, RGB data may be suitably sub-sample, and upper (U) and lower (L) values determined for each color (Red, Blue, Green). Since the sensitivity of the eye to different colors is not uniform, the sampling size, U/L resolution, and/or number of standard values may be suitably altered to provide a suitable combination of picture quality and compression factor.

Also an adaptive bit allocation approach for computing the upper (U) and lower (L) values may increase the compression ratio and/or the perceptive quality for may types of images such as a video stream. In this scheme for example, four bits for the upper (U) and lower (L) values can represent the absolute value of sharp transitions and can represent a delta or difference for smooth transitions similar to adaptive digital pulse code modulated (ADPCM) techniques.

We claim:

1. A video controller for receiving and decompressing compressed motion video data, said compressed motion video data comprising at least a pixel luminance bit map, each bit of said pixel luminance bit map designating a corresponding upper and lower luminance value, said video controller comprising:

a pixel clock for generating a pixel clock signal;

a FIFO for receiving at least said pixel luminance bit map and said upper and lower luminance values;

data transfer means, coupled to said FIFO for retrieving and selectively transferring said pixel luminance bit map and said upper and lower luminance values;

a serializer, coupled to said data transfer means and said pixel clock, for storing said pixel luminance bit map and outputting a sequential bit from said pixel luminance bit map with each pixel clock cycle;

an upper luminance value register, coupled to said data transfer means and said pixel clock, for storing an upper luminance value and outputting said upper luminance value at each pixel clock cycle;

a lower luminance value register, coupled to said data transfer means and said pixel clock, for storing a lower luminance value and outputting said lower luminance value at each pixel clock cycle;

a MUX, coupled to said serializer, said upper luminance data register and said lower luminance data register, for selectively outputting said upper luminance value or said lower luminance value as a pixel luminance value in response to the sequential bit output from said pixel luminance bit map with each pixel clock cycle; and conversion means, coupled to said MUX for converting said pixel luminance value to a display signal.

2. The video controller of claim 1, wherein said FIFO further receives pixel chrominance difference bit maps and corresponding upper and lower values, and said data transfer means retrieves and selectively transfers said pixel chrominance difference bit maps and corresponding upper and lower values, said video controller further comprising:

at least one chrominance serializer, coupled to said data transfer means and said pixel clock, for storing one of said pixel chrominance difference bit maps and outputting a sequential bit from said one of said pixel chrominance difference bit maps with each pixel clock cycle;

an upper chrominance difference value register, coupled to said data transfer means and said pixel clock, for storing an upper chrominance difference value and outputting said upper luminance value synchronized with said pixel clock;

a lower chrominance difference value register, coupled to said data transfer means and said pixel clock, for storing a lower chrominance difference value and outputting said lower chrominance difference value synchronized with said pixel clock; and a MUX, coupled to said serializer, said upper luminance data register and said lower luminance data register, for selectively outputting said upper chrominance difference value or said lower chrominance difference value as a pixel chrominance difference value in response to the sequential bit output from said pixel chrominance difference bit map with each pixel clock cycle.

3. The apparatus of claim 2, wherein said conversion means comprises a color space converter.

4. An apparatus for displaying motion video comprising:

a data compressor for compressing the motion video data;

an interface device, coupled to said compressor, for receiving said compressed motion video data and transmitting said compressed motion video data to a computer;

a computer for receiving said compressed motion video data and decompressing said motion video data, said computer comprising:

(a) a computer I/O port, for removably coupling said interface device and receiving said compressed motion video data, (b) a computer data bus, coupled to said computer I/O port transmitting data including said compressed motion video data within said computer, (c) a memory, coupled to said computer data bus, for receiving and storing data including said compressed motion video data, (d) a processor, coupled to said computer data bus, for retrieving said compressed motion video data from said memory, and serializing said compressed motion video data to produce serialized compressed motion video data, (e) a video memory, coupled to said computer data bus, for receiving and storing said serialized compressed motion video data, and (f) a video controller, coupled to said computer data bus and said video memory, for receiving said serialized, compressed motion video data, decompressing said serialized, compressed motion video data, and outputting a motion video signal; and a display, coupled to said computer, for receiving said motion video signal and displaying said motion video.

5. A method of compressing video data comprising at least one video image comprising pixel data, said method comprising the steps of:

determining the distribution of the luminance of a first predetermined number of pixels, including a mean value and a standard deviation;

determining an upper value and a lower value which when combined have substantially the same mean and standard deviation as the distribution of the luminance of said first predetermined number of pixels;

comparing the luminance value of each of said first predetermined number of pixels to the mean value of said distribution of the luminance of said first predetermined number of pixels;

assigning a binary value to each of said first predetermined number of pixels on the basis of the comparing step to form a first pixel bit map;

converting said upper value and said lower value into binary numbers having a predetermined number of bits to form binary upper and lower values; and transmitting said first pixel bit map and said binary upper and lower values as compressed luminance data.

6. The method of claim 5, further comprising the steps of:

determining the distribution of the chrominance difference values of a second predetermined number of pixels, including mean values and a standard deviation for the respective chrominance difference values;

determining upper values and lower values for the respective chrominance difference values which when combined have substantially the same mean values and standard deviations as the respective distributions of the chrominance difference values of said second predetermined number of pixels;

comparing the chrominance difference values of each of said second predetermined number of pixels to the respective mean values of the respective distributions of the chrominance values of said second predetermined number of pixels;

assigning respective binary values to said second predetermined number of pixels on the basis of the comparing step to form respective second bit maps for the chrominance difference values;

converting said upper values and said lower values into binary numbers having a predetermined number of bits to form binary upper and lower values; and transmitting said second pixel bit maps and said binary upper and lower values as compressed chrominance difference data.

7. The method of claim 6, wherein said second number of pixels are adjacent pixels.

8. The method of claim 7, wherein said second number of pixels forms a square matrix of adjacent pixels.

9. The method of claim 8, wherein said second number of pixels forms a square matrix of sixty-four pixels.

10. The method of claim 6, wherein said second pixel bit map comprises binary data, each bit of which represents a third number of said second number of pixels.

11. The method of claim 10, wherein said third number of said second number of pixels comprises a square matrix of four adjacent pixels.

12. The method of claim 5, wherein said first number of pixels are adjacent pixels.

13. The method of claim 12, wherein said first number of pixels forms a square matrix of adjacent pixels.

14. The method of claim 13, wherein said first number of pixels forms a square matrix of sixteen pixels.

* * * * *